United States Patent [19]

Maucher et al.

[11] Patent Number: 4,700,822

[45] Date of Patent: Oct. 20, 1987

[54] TORSION DAMPING ASSEMBLY FOR CLUTCH PLATES

[75] Inventors: Paul Maucher, Sasbach; Rudolf Hönemann, Ottersweier, both of Fed. Rep. of Germany

[73] Assignee: LUK Lamellen und Kupplungsbau GmbH, Bühl, Fed. Rep. of Germany

[21] Appl. No.: 931,943

[22] Filed: Nov. 19, 1986

Related U.S. Application Data

[63] Continuation of Ser. No. 801,565, Nov. 25, 1985, abandoned.

[30] Foreign Application Priority Data

Nov. 23, 1984 [DE] Fed. Rep. of Germany ....... 3442705

[51] Int. Cl.$^4$ .............................................. F16D 3/14
[52] U.S. Cl. .................................... 192/106.2; 464/68
[58] Field of Search .......................................... 464/68

[56] References Cited

U.S. PATENT DOCUMENTS

| | | | |
|---|---|---|---|
| 4,024,938 | 5/1977 | Maucher | 192/106.2 |
| 4,433,770 | 2/1984 | Loizeau et al. | 192/106.2 |
| 4,440,283 | 4/1984 | Nioulox | 464/68 X |
| 4,485,908 | 12/1984 | Gatewood | 192/106.2 |
| 4,493,408 | 1/1985 | Nagano | 192/106.2 |
| 4,548,310 | 10/1985 | Maucher | 464/68 X |
| 4,562,913 | 1/1986 | Cucinotta et al. | 192/106.2 |
| 4,563,165 | 1/1986 | Takeuchi | 192/106.2 X |
| 4,576,267 | 3/1986 | Loizeau | 192/106.2 X |
| 4,586,595 | 5/1986 | Hartig et al. | 192/106.2 |

FOREIGN PATENT DOCUMENTS

2503295 10/1982 France ........................... 192/106.2

*Primary Examiner*—William F. Pate, III
*Assistant Examiner*—Creighton Smith
*Attorney, Agent, or Firm*—Peter K. Kontler

[57] ABSTRACT

A torsion damping assembly for the clutch plate of a friction clutch has an input component with two discs one of which carries the friction linings and which are rotatable within limits relative to a hub which transmits torque to a transmission and has external teeth in loose mesh with the internal teeth of the flange of a main torsion damping stage. The flange is disposed between the two discs and has windows for strong coil springs which further extend into registering windows of the discs. A further damping stage has two spaced-apart plates which are affixed to the flange in the space between such flange and one of the discs and are disposed at the opposite sides of a second flange which is nonrotatably secured to the hub. The second flange has windows for relatively weak coil springs which further extend into registering windows of the two plates.

26 Claims, 4 Drawing Figures

TORSION DAMPING ASSEMBLY FOR CLUTCH PLATES

This application is a continuation of application Ser. No. 801,565, filed Nov. 25, 1985 now abandoned.

CROSS-REFERENCE TO RELATED APPLICATION

The torsion damping assembly of the present invention is related to that which is disclosed in the commonly owned copending patent application Ser. No. 799,007 filed Nov. 18, 1985 by Paul Maucher et al. for "Clutch plate".

BACKGROUND OF THE INVENTION

The present invention relates to clutch plates or like torque transmitting devices in general, and more particularly to improvements in torsion damping assemblies which can be utilized in clutch plates of friction clutches for motor vehicles or the like.

It is already known to provide a clutch plate with a torsion damping assembly wherein the input and output components of the clutch plate are angularly movable relative to each other against the opposition of a first damping stage which employs relatively weak energy storing means in the form of coil springs or the like, as well as against the opposition of a second damping stage which operates with stronger energy storing means in the form of coil springs or the like. The relatively weak springs operate between the input and output elements of the first damping stage, and the stronger springs operate between the input and output members of the second damping stage. It is further known to provide the torsion damping assembly with an output component in the form of a hub having internal teeth which can mate with external teeth on the input shaft of a change-speed transmission if the clutch plate is put to use in a friction clutch serving to transmit torque from the internal combustion engine to the change-speed transmission of a motor vehicle. The hub is non-rotatably secured to the output element of the first damping stage and further carries the normally flange-like output member of the second damping stage. As a rule, the flange of the second damping stage has internal teeth which mate, with a certain amount of play, with external teeth on the hub. It is further known to assemble the input component of the clutch plate from two discs which are axially spaced apart from one another and flank the flange (output member) of the main damping stage. Reference may be had, for example, to the published British patent application Ser. No. 2 080 488 of Carray which discloses that the first damping stage is installed at the outer side of one of two discs which constitute the input component of the torsion damping assembly. The mounting of the first damping stage at the outer side of one of the discs is a separate operation which precedes the assembly of the clutch plate. This contributes to the initial cost of the clutch plate, especially since the installation of the first damping stage at the outer side of one disc of the input component necessitates the utilization of a full set of distancing elements for attachment of the first damping stage to the respective disc. Moreover, the space requirements of the torsion damping assembly of Carray are substantial, especially as considered in the axial direction of the clutch plate.

Published French patent application Ser. No. 2 503 295 of Muller discloses a torsion damping assembly wherein the first damping stage is disposed radially inwardly of and is surrounded by the second damping stage, i.e., the two damping stages are in radial alighment with each other. Such torsion damping assemblies are quite bulky (especially as considered in the radial direction of the clutch plate), namely even bulkier than the torsion damping assemblies of the type disclosed by Carray.

OBJECTS AND SUMMARY OF THE INVENTION

An object of the invention is to provide a multi-stage torsion damping assembly which is not only simpler but also more compact than conventional torsion damping assemblies.

Another object of the invention is to provide a torsion damping assembly whose space requirements, as considered in the axial and radial directions of its rotary parts, are smaller than those of the aforedescribed presently known assemblies.

A further object of the invention is to provide a torque damping assembly whose installation in a friction clutch or the like is simpler and less time-consuming than the installation of presently known assemblies.

An additional object of the invention is to provide an assembly which comprises a relatively small number of simple and inexpensive parts, certain parts of which can be mass-produced at a very low cost, and which can furnish a highly satisfactory torsion damping action.

A further object of the invention is to provide a clutch plate, particularly a clutch plate for use in the friction clutches of motor vehicles, which employs the above outlined torsion damping assembly.

Still another object of the invention is to provide a torsion damping assembly wherein several parts can perform plural functions to thus allow for a reduction of the overall number of parts.

The invention is embodied in a torque transmitting device, particularly in a clutch plate which can be used in the friction clutch of a motor vehicle. More particularly, the invention is embodied in a torque transmitting assembly which can form part of or which can constitute the torque transmitting device and comprises an input component (comprising two axially spaced-apart coaxial discs) and a substantially hub-shaped output component which is surrounded by the input component, a first torsion damping stage having coaxial input and output elements which are rotatable relative to each other within first limits and first energy storing means interposed between the input and output elements to oppose their rotation relative to each other with a first force, and a second torsion damping stage having an input member, a preferably flange-like output member which is coaxial with and is rotatable relative to the input member within second limits, and second energy storing means interposed between the input and output members to oppose their rotation relative to each other with a (preferably greater) second force. The output member of the second damping stage is coaxially mounted on the output component with an angular play, the discs of the input component flank the output member, and the first stage is interposed between the output member and one of the discs. The output component is preferably provided with internal teeth so that it can transmit torque to the input shaft of a change-speed transmission in a motor vehicle if the improved assembly forms part of or constitutes a clutch plate in the friction clutch of an automobile or the like. The output element of the first stage is preferably coaxial with and is preferably non-rotatably secured to the output component of the torsion damping assembly. The play between the external teeth of the output component and the internal teeth of the output member is preferably within the aforementioned first limits.

The input element preferably comprises two spaced-apart coaxial discs (hereinafter called plates to distinguish them from the discs of the input component) which are secured to the output member and have registering windows for portions (e.g., discrete coil springs) of the first energy storing means. The output element of the first stage can comprise or constitute a flange which is non-rotatably secured to the output component and has additional windows for portions of the first energy storing means. The flange is disposed between the plates of the input element. One of these plates can abut directly against the output member of the second damping stage. Form-locking means can be provided for non-rotatably connecting the plates of the input element to the output member; such form-locking means can comprise projections (e.g., in the form of lugs or pins or studs) which are provided on the other plate and extend substantially axially of the torque transmitting device into holes, bores, cutouts or otherwise configurated recesses which are provided therefor in the output member. The projections are preferably formed with tips which taper in a direction axially of the torque transmitting device and away from the other plate, and with shoulders which serve to urge the one plate against the output member. The one plate is preferably provided with cutouts through which the tips of the projections on the other plate extend toward and into the respective recesses of the output member. The shoulders then abut against the one plate to thereby maintain the two plates at a fixed axial distance from each other while simultaneously urging the one plate against the output member. The width of the tips can decrease in a direction axially of the components and away from the other plate. Means can be provided for biasing the one plate against the output member; such biasing means can react against the input member and can bear against the other plate to thereby urge the one plate against the output member. The input member of the second damping stage can comprise two axially spaced-apart coaxial discs, and the biasing means can comprise a prestressed spring (e.g., an undulate spring) which reacts against one of the discs forming part of the input member. The other disc of the input component can be provided with a convex or substantially convex surface which is in direct frictional engagement with the output member of the second damping stage. For example, such other disc can have one or more substantially annular corrugations, and the convex surface or surfaces can be provided on such corrugation or corrugations. The convex surface or surfaces are preferably closely adjacent to the common axis of the input and output components, i.e., to the axis of the aforementioned hub-shaped output component. The input component can include or constitute the input member of the second damping stage.

The one disc of the input component can carry a set of friction linings if the torque transmitting device is the clutch plate of a friction clutch.

The second damping stage can further comprise a friction generating ring having an annular portion which is surrounded by one disc of the input component and surrounds the output component, and a radially extending second portion which is adjacent to one side of the respective disc.

The output element of the first damping stage can constitute a flange which is axially clamped between a set of external teeth on the hub-shaped output component and an external upset portion of the output component.

At least one element of the first damping stage can contain or consist of a synthetic plastic material. For example, the input element of the first damping stage can be made of a fiber-reinforced synthetic plastic material and can be designed to transmit to the output component moments which develop under the action of the springs of the first energy storing means. Such springs are preferably accommodated in circumferentially extending windows of the input element and react against the input element, e.g., by further extending into windows which are provided therefor in the preferably flange-like output element of the first damping stage. The internal teeth of the plastic output element can mate directly with the external teeth of the output component.

The novel features which are considered as characteristic of the invention are set forth in particular in the appended claims. The improved assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
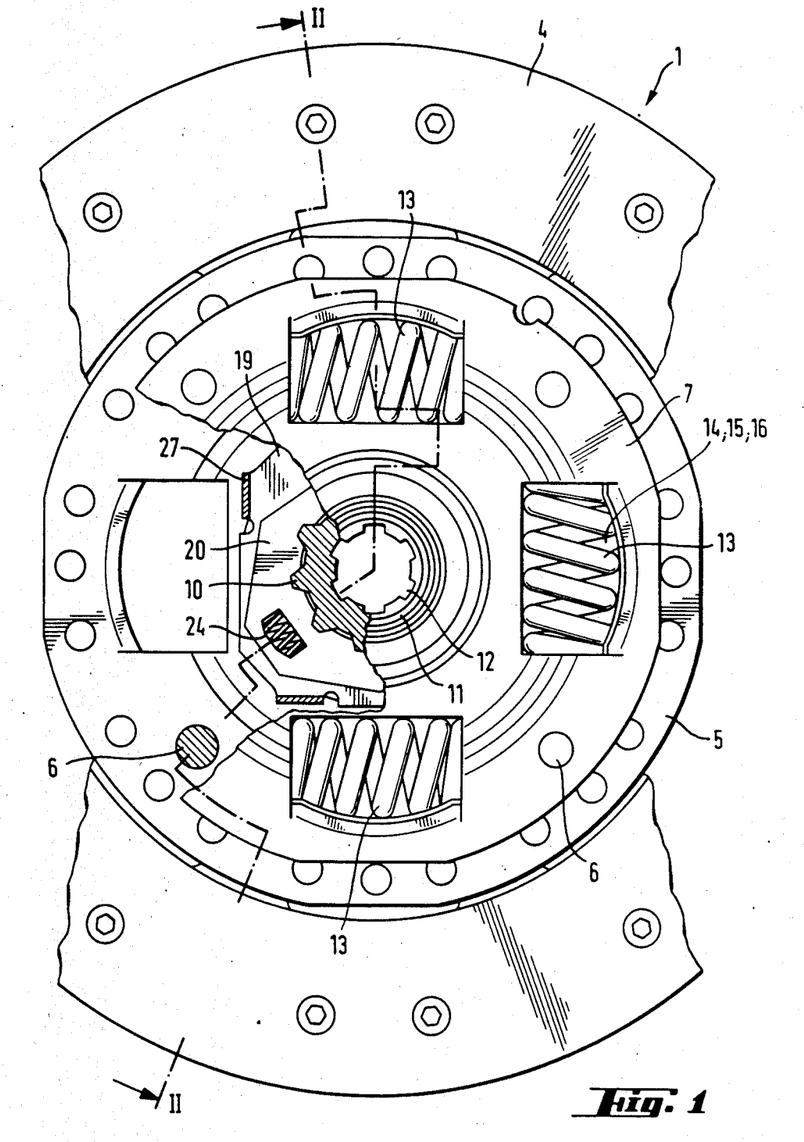
FIG. 1 is a fragmentary front elevational view of a clutch plate with a torsion damping assembly which embodies one form of the invention, a portion of the torsion damping assembly being broken away to show parts of the first damping stage.
Figures 2, 3:
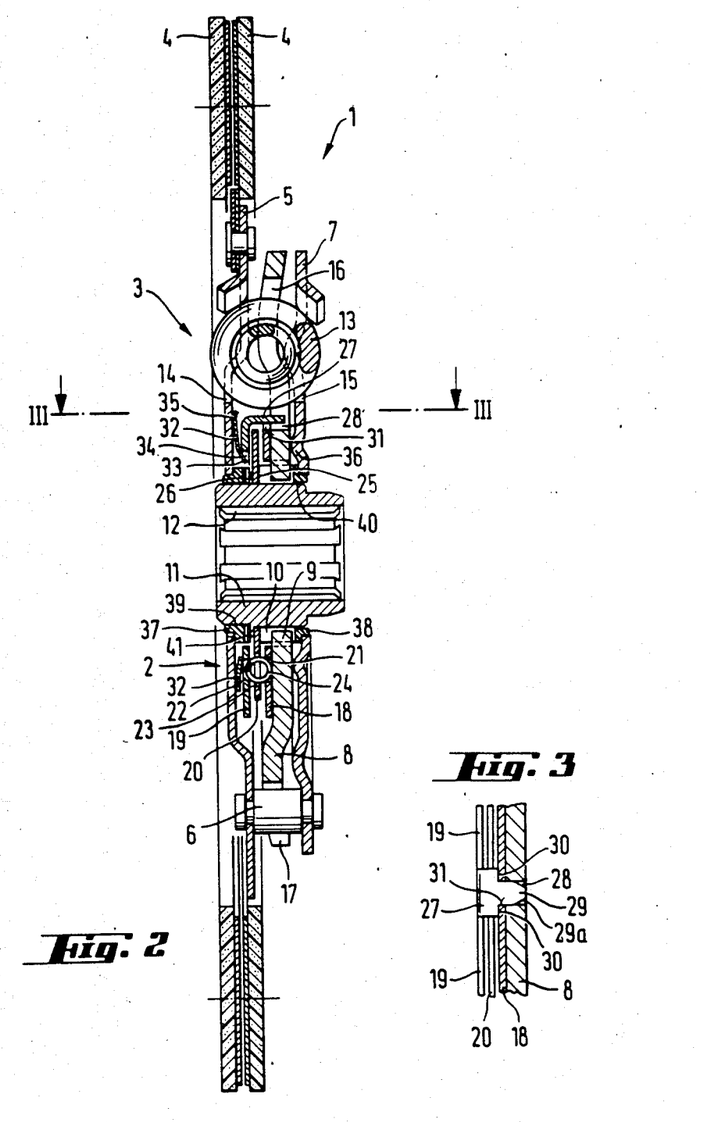
FIG. 2 is a sectional view as seen in the direction of arrows from the line II—II of FIG. 1.
FIG. 3 is a fragmentary sectional view as seen in the direction of arrows from the line III—III of FIG. 2.

Referring first to FIGS. 1 and 2, there is shown a clutch disc or clutch plate 1 which comprises a first damping stage 2 and a second or main damping stage 3. The input component of the clutch plate 1 includes a disc-shaped carrier 5 for two friction linings 4, and the disc 5 simultaneously constitutes one part of the input member of the main damping stage 3. Such input component further comprises a second disc 7 which is rigidly secured to the disc 5 by a set of distancing elements 6 in the form of rivets. The output member of the main damping stage 3 is a flange 8 which has a set of internal teeth 9 mating with the external teeth 10 of a hub 11 which constitutes the output component of the clutch plate 1. The teeth 9 and 10 mate with a certain amount of play which determines the operating range of the first damping stage 2. The hub 11 is further formed with internal teeth 12 which mate with the external teeth of a driven element, e.g., with the external teeth of the input shaft of a change-speed transmission in a motor vehicle.

The main damping stage 3 further comprises energy storing coil springs 13 which are installed in registering windows 14, 15 of the discs 5, 7 on the one hand and in the windows 16 of the flange 8 on the other hand. The flange 8 can rotate (within limits) relative to the input member including the discs 5, 7 and the rivets 6 (and vice versa) against the opposition of the coil springs 13. The extent of such angular movability is determined by the length (as considered in the circumferential direction of the members 5, 7) of cutouts or slots 17 which are provided in the flange 8 and receive the median portions of the respective rivets 6. The number of cutouts or slots 17 may but need not match the number of rivets 6.

The first damping stage 2 is installed between the flange 8 and the disc 5, as considered in the axial direction of the clutch plate 1. The input element of the stage 2 includes two spaced-apart disc-shaped parts (hereinafter called plates) 18, 19 which are non-rotatably secured to the flange 8 and flank a disc-shaped second flange 20 constituting the output element of the first damping stage 2. The flange 20 is non-rotatably secured to the hub 11. The flange 20 and the elements 18, 19 can perform limited angular movements relative to each other due to the aforementioned play between the external teeth 10 of the hub 11 and the internal teeth 9 of the flange 8. Such angular movements must take place against the opposition of energy storing devices in the form of coil springs 24 which are received in the windows 21, 22 of the elements 18, 19 as well as in the windows 23 of the flange 20.

The flange 20 abuts against a step or shoulder 25 at one axial end of the set of external teeth 10 on the hub 11, and this flange is formed with a set of internal teeth which mate with shallower portions of the teeth 10 in such a way that the flange 20 is compelled to share all angular movements of the hub 11. An upset portion 26 of the hub 11 maintains the flange 20 in contact with the shoulder or stop 25.

The plates 18, 19 which constitute the input element of the first damping stage 2 are form-lockingly connected to the flange 8 in such a way that they share the angular movements of the flange. To this end, the peripheral portion of the plate 19 (which is disposed between the disc 5 and the flange 20) is formed with form-locking projections in the form of lugs 27 which extend in substantial parallelism with the axis of the clutch plate 1 and into complementary recesses 28 of the flange 8. In the embodiment of FIGS. 1 to 3, the recesses 28 communicate with the windows 16 of the flange 8, i.e., with the openings which are provided in the flange 8 to receive portions of the energy storing coil springs 13. The lugs 27 extend axially beyond the disc-shaped flange 20 of the first damping stage 2 and their free end portions or tips 29 are of reduced width (see FIG. 3) and are received in corresponding recesses 28 of the flange 8. The wider and narrower portions of the lugs 27 define shoulders 30 which abut against the respective side of the plate 18. The shoulders 30 maintain the plate 18 in contact with the respective side of the flange 8. The periphery of the plate 19 is formed with cutouts 31 for the narrower portions or tips 29 of the lugs 27 which hold the plate 19 in a preselected axial position. The tips 29 of the lugs 27 have wedge-like tapering portions 29a which facilitate the introduction of lugs 27 into the recesses 28 and cutouts 31 and thus allow for a reduction of the interval of time which is needed for assembly of the improved clutch plate 1. The plates 18 and 19 of the first damping stage 2 are biased axially by a dished spring 32 which reacts against the disc 5 and bears against the plate 19. The arrangement is preferably such that the radially outermost portion of the spring 32 contacts the disc 5 and the radially innermost portion of the spring 32 contacts the plate 19. This spring urges the shoulders 30 of the lugs 27 against the plate 18 whereby the plate 18 is urged against the flange 8. The spring 32 is provided with radially inwardly extending arms 33 which hold it against rotation relative to the flange 8 and, to this end, extend into cutouts 34 which are provided in the plate 19. The radially outermost portion of the dished spring 32 is preferably provided with a convex surface (as at 35) which is in frictional contact with the respective side of the disc 5. Such frictional contact is established and maintained because the spring 32 is installed in prestressed condition. Initial stressing of the spring 32 further ensures that the disc 5 pulls the disc 7 axially against the respective side of the flange 8. The radially innermost portion of the disc 7 has a corrugation 36 whose convex side is in frictional contact with the flange 8. Such frictional contact is established and maintained by the prestressed dished spring 32.

The discs 5 and 7 are mounted on the hub 11 with the interposition of two friction generating rings 37, 38 which respectively abut shoulders 39 and 40 of the hub 11. Each of the rings 37, 38 has a substantially L-shaped cross-sectional outline with the annular portion disposed adjacent to the external surface of the hub 11 and with the radially disposed portion adjacent to the inner side of the respective disc 5, 7. A spring in the form of an undulate washer 41 is installed in prestressed condition between the radially extending portion of the ring 39 for the disc 5 and the upset portion 26 of the hub 11. The washer 41 biases the disc 5 axially in a direction away from the external teeth 10 of the hub 11 and thereby ensures that the radially extending portion of the ring 38 for the disc 7 is clamped between the disc 7 and the end face of the set of external teeth 10 on the hub 11.

When the clutch plate 1 is held in a neutral position and its input component including the discs 5, 7 is caused to turn relative to the hub 11 or vice versa, such angular movement is opposed first by the energy storing coil springs 24 of the first damping stage 2 as well as by the friction generating rings 37, 38 for the discs 5 and 7. When the aforementioned play between the external teeth 10 of the hub 11 and the internal teeth 9 of the flange 8 is eliminated, the first damping stage 2 is rendered ineffective because further angular movement of the discs 5, 7 relative to the hub 11 and/or vice versa is opposed only by the energy storing coil springs 13 of the main damping stage 3. In addition to the springs 13, such further angular displacement of the members 5, 7 relative to the hub 11 is opposed by frictional forces which are generated by the rings 37, 38 for the discs 5, 7 as well as (and primarily) by the dished spring 32, which is in frictional engagement with the disc 5, and the corrugation 36 of the disc 7 which bears against the flange 8.

Figure 4:
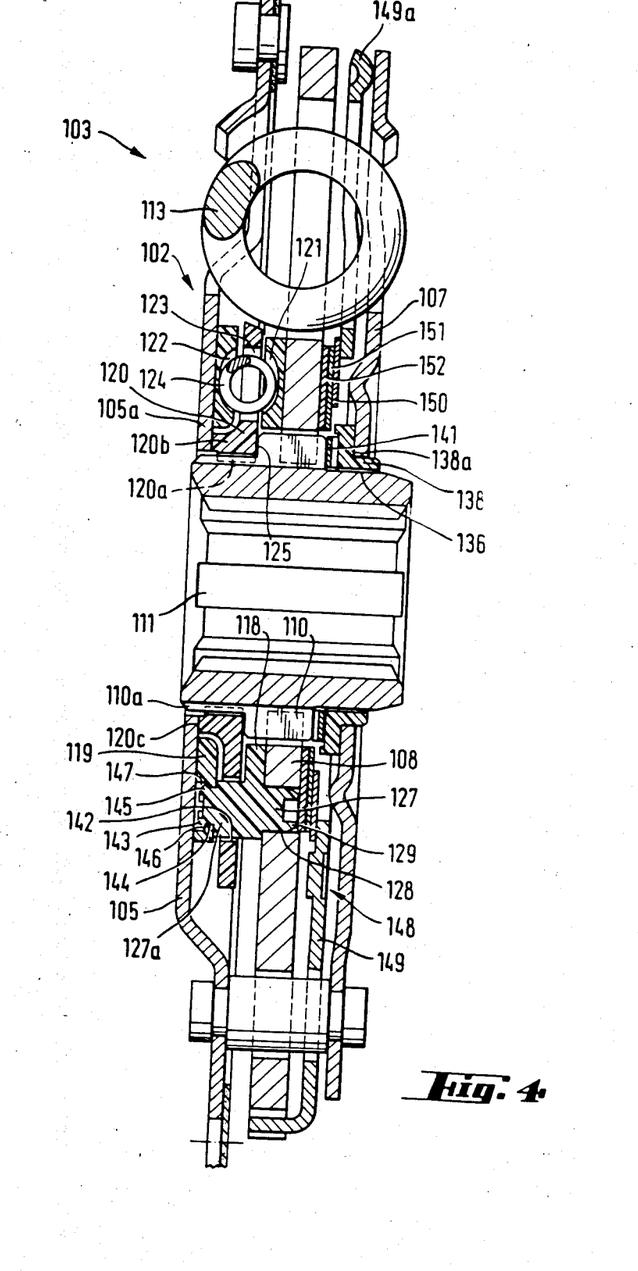
FIG. 4 is a fragmentary axial sectional view of a modified torsion damping assembly.

FIG. 4 shows a portion of a modified clutch plate wherein all such parts which are identical with or clearly analogous to the corresponding parts of the clutch plate 1 are denoted by similar reference characters plus 100. The flange-like output element 120 of the first damping stage 102 is made of a synthetic plastic material which is preferably reinforced by fibers and which bears axially against a shoulder 125 at one axial end of the set of external teeth 110 on the hub 111. The flange 120 is formed with an annulus of internal teeth 120a which mate with the modified portions 110a of the external teeth 110 so as to ensure that the hub 111 and the flange 120 cannot rotate relative to each other. The flange 120 is further formed with an axially extending annular portion 120b having an end face 120c which abuts against the inner side of the radially innermost portion 105a of the disc 105. The other disc 107 at the other axial end of the set of external teeth 110 is mounted on the ring 138 in such a way that it surrounds the annular portion of this ring and is adjacent to one side of the radially extending portion 138a. The other side of the radially extending portion 138a of the ring 138 is engaged by a prestressed annular spring 141 in the form of an undulate washer which ensures that the flange 120 of the first damping stage 102 is clamped axially between the end face 125 of the set of external teeth 110 and the disc 105. Thus, when the disc 105 is caused to turn relative to the hub 111 and/or vice versa, such angular movement is opposed by friction between the radially innermost portion 105a of the disc 105 and the end face 120c of the annular portion 120b of the flange 120.

The input element of the first damping stage 102 again comprises two plates 118, 119 which are also made from a preferably fiber-reinforced synthetic plastic material and are directly or indirectly and form-lockingly connected with the flange 108, i.e., with the output member of the main damping stage 103. The illustrated form-locking connection comprises pin-shaped projections 127 provided on the plate 118 (which is disposed between the flange 120 of the first damping stage 102 and the flange 108 of the main damping stage 103) and extending axially into the recesses or holes 128 of the flange 108. The free end portions or tips 129 of the pin-shaped projections 127 are resilient, as considered in the radial direction of the clutch plate, and engage the surfaces adjacent to the respective recesses 128 so that they are hooked to the flange 108. The plate 118 is further provided with a second set or group of projections 127a which extend axially in a direction away from the flange 108 and through cutouts or recesses 142 of the flange 120. The free end portions of the projections 127a are at least partly elastic, as considered in the radial direction of the clutch plate, and such at least partly elastic portions of the projections 127a extend axially through recesses or cutouts 144 of the plate 119 so that their substantially hook-shaped portions 145 engage shoulders 146 of the plate 119 and thus hold the plate 119 against axial movement relative to the plate 118 and flange 108. The shoulders 146 of the plate 119 are formed by countersunk portions 147. The plastic plate 119 is in direct frictional engagement with the disc 105 and serves to produce a frictional damping action for the main damping stage 103. Such construction of the clutch plate is desirable and advantageous because the number of friction rings can be reduced due to the fact that the plate 119 performs two functions, namely (a) it serves as a means for receiving portions of coil springs 124 forming part of the first damping stage 102, and (b) it constitutes a friction ring. Moreover, the first damping stage 102 can be produced at a relatively low cost because the plates 118, 119 and the flange 120 can constitute mass-produced extruded or otherwise formed plastic articles. Moreover, and as described before, such plastic parts can be designed to ensure proper engagement of the plates 118, 119 and flange 108 with each other by a simple snap action so that they are held against axial and/or angular movement.

The plates 118, 119 and the flange 120 are respectively formed with windows 121, 122 and 123 for the energy storing coil springs 124 of the first damping stage 102.

A load friction generating device 148 between the flange 108 and the disc 107 comprises a washer 149 which cooperates with the energy storing coil springs 113 of the main damping stage 103. The radially outermost portion of the washer 149 is formed with one or more corrugations 149a which are in frictional damping contact with the respective side of the disc 107. A dished spring 150 bears against the radially innermost portion of the washer 149 to bias the latter axially against the disc 107 and to generate a frictional damping action. The dished spring 150 is installed in prestressed condition and reacts against a washer 151 which urges a friction generating washer 152 against the flange 118. The dished spring 150 further ensures that the plates 118, 119 of the first damping stage 102 are axially clamped between the flange 108 and the disc 105.

The improved clutch plate is susceptible of many additional modifications without departing from the spirit of the invention. Furthermore, the improved clutch plate can be used not only in friction clutches for motor vehicles but also in many other types of clutches. The invention can be embodied in all or nearly all clutch plates of the type wherein the main damping stage has a disc-shaped member and a flange which is mounted on the hub of the clutch plate with a certain amount of angular play and wherein the springs of the first damping stage can be covered or overlapped by a disc-shaped member of the main damping stage.

An important advantage of the improved torsion damping assembly is that its space requirements are surprisingly small. This is due to the fact that the entire first damping stage can be installed in the space between one of the discs 5, 7 or 105, 107 and the flange 8 or 108, i.e., in the space which is available in many clutch plates. Another important advantage of such mounting of the improved assembly is that the energy storing springs of the first damping stage are axially offset relative to the energy storing springs of the main damping stage so that the springs 13 or 113 and 24 or 124 can be placed nearer to each other, as considered in the radial direction of the clutch plate. This also contributes to reduced space requirements of the assembly.

The feature that the input element of the first damping stage comprises two axially spaced-apart plates and also contributes to compactness and particularly to simplicity of the improved assembly. Thus, the coil springs of the first stage can be installed in windows which are provided in the plates 9 rather than in windows of the flange 8 or 108, i.e., of the output member of the main damping stage. The provision of windows for the springs 24 or 124 in the flange 8 or 108 could entail undue weakening of such flange, especially since the flange 8 or 108 is already provided with windows for the larger and stronger coil springs 13 or 113 of the main damping stage. Consequently, the main damping stage can transmit pronounced torque. Still further, the mounting of each of the weaker coil springs 24 or 124 in three windows (21, 22 and 23 or 121, 122 and 123) ensures more reliable installation of such springs as considered in the radial as well as in the axial direction of the clutch plate.

Additional savings in space (as considered in the axial direction of the clutch plate) are achieved in that the plate 18 or 118 of the input element of the first damping stage abuts directly against the flange 8 or 108 (output member) of the main damping stage. The provision of form-locking projections 27 or 127, 127a on the plate 19 or 118 also contributes to compactness as well as to simplicity and lower cost of the torsion damping assembly because such lugs can hold the plate 19 or 119 at a desired axial distance from the plate 18 or 118 and flange 8 or 108, and the lugs can also hold the plates 18, 19 or 118, 119 against rotation relative to the flange 8 or 108. Still further, the shoulders 30 of the assembly of FIGS. 1–3 can bias the plate 18 against the flange 8. The making of lugs as integral parts of one of the two plates also contributes to simplicity, lower cost and compactness of the assembly and to a reduction of the assembling time. The recesses 28 or 128 can form part of the respective windows to further simplify the making of the flange 8 or 108. The provision of tapering portions 29a on the tips 29 of the lugs 27 contributes to convenience of assembling the two damping stages with each other and with other parts of the clutch plate 1.

In the embodiment of FIGS. 1 to 3, the spring 32 has arms 33 which serve as a means for non-rotatably coupling this spring to the plate 19 of the first damping stage 2. It is equally possible to have the legs 33 extend into adjacent recesses or cutouts of the disc 5 so that the spring 32 cannot rotate relative to the input component of the torsion damping assembly. The convex surface 35 is then provided at the other side of the spring 32 so that it is held in frictional engagement with the plate 19 of the first damping stage 2 or with the flange 8 of the main damping stage 3.

The flange of the first damping stage can be held against rotation relative to the hub in a number of different ways. Thus, such flange can have internal teeth (as shown at 120a in FIG. 4) which mate with the external teeth of the hub. Alternatively, or in addition thereto, the flange of the first damping stage can be axially clamped against a suitable shoulder or stop on the hub.

The features which are shown in FIG. 4 (namely wherein the input and/or output element of the first damping stage 102 consists of or contains a highly wear-resistant synthetic plastic material) contribute to a reduction of the weight as well as to a lower cost of the improved torsion damping assembly. Certain other parts (note the ring 138 of FIG. 4) can also consist of a suitable wear-resistant friction generating material to further reduce the cost of the torsion damping assembly.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In a torque transmitting device, particularly in a clutch plate for use in the friction clutch of a motor vehicle, a torsion damping assembly comprising an input component and a substantially hub-shaped coaxial output component; a first torsion damping stage having coaxial input and output elements rotatable relative to each other within first limits, and first energy storing means interposed between said elements to oppose their rotation relative to each other with a first force; a second torsion damping stage having an input member, a flange-like output member coaxial with and rotatable relative to said input member within second limits, and second energy storing means interposed between said members to oppose their rotation relative to each other with a second force, said input element comprising two spaced-apart coaxial plates secured to said output member, said plates having registering windows and said first energy storing means having portions in said windows, one of said plates abutting directly against said output member and said output element comprising a flange which is non-rotatably secured to said output element and has windows for said portions of said first energy storing means, said flange being disposed between said plates, said output member being coaxially mounted on said output component with an angular play and said input component comprising two axially spaced-apart coaxial discs flanking said output member, said first stage being disposed between said output member and one of said discs; and form-locking means for non-rotatably connecting said plates to said output member.

2. The assembly of claim 1, wherein said output component has internal teeth for transmission of torque to the input element of a transmission.

3. The assembly of claim 1, wherein said output element is coaxial with and is non-rotatably secured to said output component.

4. The assembly of claim 1, wherein said output member has internal teeth and said output component has external teeth meshing with said internal teeth with a play within said first limits.

5. The assembly of claim 1, wherein said form-locking means comprises projections provided on the other of said plates and extending axially into recesses which are provided therefor in said output member.

6. The assembly of claim 1, wherein said projections have tips and shoulders adjacent to such tips, said tips being received in the respective recesses and said shoulders being arranged to urge said one plate against said output member.

7. The assembly of claim 6, wherein said one plate has cutouts through which the tips of said projections extend into the respective recesses of said output member.

8. The assembly of claim 7, wherein said shoulders abut said one plate to maintain said plates at a fixed axial distance from each other while simultaneously urging said one plate against said output member.

9. The assembly of claim 6, wherein the width of said tips decreases axially of said components and in a direction away from said other plate.

10. The assembly of claim 1, further comprising means for biasing said one plate against said output member.

11. The assembly of claim 10, wherein said biasing means reacts against said input member and bears against said other plate to thereby urge said one plate against said output member.

12. The assembly of claim 11, wherein said input member comprises two coaxial axially spaced apart discs and said biasing means comprises a prestressed spring which reacts against one of said discs.

13. The assembly of claim 1, wherein the other of said discs has a convex surface in direct frictional engagement with the output member of said second damping stage.

14. The assembly of claim 13, wherein said other disc has a substantially annular corrugation and said convex surface is provided on said corrugation.

15. The assembly of claim 14, wherein said convex surface is closely adjacent to the axis of said output component.

16. The assembly of claim 1, wherein said input component includes the input member of said second damping stage.

17. The assembly of claim 1, further comprising friction linings provided on said one disc.

18. The assembly of claim 1, wherein said second damping stage further comprises a friction generating ring having an annular portion surrounded by said one disc and surrounding said output component, and a radially extending portion adjacent to one side of said one disc.

19. The assembly of claim 1, wherein at least one of said elements contains a synthetic plastic material.

20. The assembly of claim 19, wherein said output element consists of synthetic plastic material and is arranged to transmit to said output component moments under the action of said first energy storing means.

21. The assembly of claim 20, wherein said output element has circumferentially extending windows for portions of said first energy storing means and said first energy storing means reacts against said input element.

22. The assembly of claim 20, wherein said output component has a set of external teeth and said output element has internal teeth mating with the external teeth of said output component.

23. The assembly of claim 1, wherein said first energy storing means is nearer to the common axis of said components than said second energy storing means.

24. The assembly of claim 1, further comprising at least one friction lining provided on at least one of said discs.

25. The assembly of claim 1, wherein said second energy storing means comprises a plurality of springs disposed at the same distance from the common axis of said components.

26. In a torque transmitting device, particularly in a clutch plate for use in the friction clutch of a motor vehicle, a torsion damping assembly comprising an input component and a substantially hub-shaped coaxial output component, said output component having a set of external teeth and an upset portion adjacent to one axial end of said set of teeth; a first torsion damping stage having coaxial input and output elements rotatable relative to each other within first limits, and first energy storing means interposed between said elements to oppose their rotation relative to each other with a first force, said output element being clamped axially between said set of teeth and said upset portion; and a second torsion damping stage having an input member, a flange-like output member coaxial with and rotatable relative to said input member within second limits, and second energy storing means interposed between said members to oppose their rotation relative to each other with a second force, said output member being coaxially mounted on said output component with an angular play and said input component comprising two axially spaced-apart coaxial discs flanking said output member, said first stage being disposed between said output member and one of said discs.

* * * * *

UNITED STATES PATENT AND TRADEMARK OFFICE
CERTIFICATE OF CORRECTION

PATENT NO. : 4,700,822
DATED : October 20, 1987
INVENTOR(S) : Paul MAUCHER et al.

It is certified that error appears in the above-identified patent and that said Letters Patent are hereby corrected as shown below:

Col. 10, Line 16 - "element" should be changed to read --component--.

Signed and Sealed this

First Day of November, 1988

Attest:

DONALD J. QUIGG

Attesting Officer

Commissioner of Patents and Trademarks